US008811550B2

(12) United States Patent
Corona et al.

(10) Patent No.: US 8,811,550 B2
(45) Date of Patent: Aug. 19, 2014

(54) RECURSIVE IMPLEMENTATION FOR CALCULATION OF WHITENING MATRIX

(75) Inventors: James Corona, San Diego, CA (US); Robert Jason Fuchs, San Diego, CA (US); Hao Xu, San Diego, CA (US); Ke Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 451 days.

(21) Appl. No.: 13/017,308

(22) Filed: Jan. 31, 2011

(65) Prior Publication Data

US 2011/0280295 A1 Nov. 17, 2011

Related U.S. Application Data

(60) Provisional application No. 61/333,612, filed on May 11, 2010.

(51) Int. Cl.
*H04L 25/08* (2006.01)
(52) U.S. Cl.
USPC ........................................................ 375/346
(58) Field of Classification Search
CPC .... H04B 7/0854; H04B 15/00; H04B 17/005; H04B 17/0055; H04L 25/03993; H04L 25/0242; H04L 25/03299; H04L 25/0216; H04L 25/0328
USPC ......... 375/259, 260, 167, 285, 295, 296, 299, 375/316, 346, 347
See application file for complete search history.

(56) References Cited

U.S. PATENT DOCUMENTS

| 7,388,935 | B2* | 6/2008 | Hui ............................... 375/340 |
| 7,536,158 | B2* | 5/2009 | Bottomley et al. ........... 455/135 |
| 8,280,332 | B2* | 10/2012 | Lee et al. .................... 455/278.1 |
| 8,300,742 | B1* | 10/2012 | Bromberg et al. ............ 375/346 |
| 2004/0028155 | A1* | 2/2004 | Dornstetter et al. .......... 375/343 |
| 2004/0139137 | A1 | 7/2004 | Mailaender et al. |
| 2005/0232174 | A1 | 10/2005 | Onggosanusi et al. |
| 2006/0235919 | A1* | 10/2006 | Lee et al. ...................... 708/426 |
| 2007/0070924 | A1* | 3/2007 | Krupka ......................... 370/286 |
| 2010/0136940 | A1* | 6/2010 | Hui et al. ...................... 455/307 |
| 2010/0158162 | A1* | 6/2010 | Fujii ............................. 375/341 |
| 2010/0202571 | A1* | 8/2010 | Park et al. .................... 375/341 |
| 2010/0203858 | A1* | 8/2010 | Lee et al. ..................... 455/273 |
| 2010/0227562 | A1* | 9/2010 | Shim et al. .................. 455/63.1 |

FOREIGN PATENT DOCUMENTS

WO 2006067258 A1 6/2006

OTHER PUBLICATIONS

International Search Report and Written Opinion—PCT/US2011/036048, ISA/EPO—Oct. 21, 2011.

* cited by examiner

*Primary Examiner* — Tesfaldet Bocure
(74) *Attorney, Agent, or Firm* — Kenneth Vu; Ashish L. Patel

(57) ABSTRACT

Certain aspects of the present disclosure relate to techniques for recursive implementation of whitening matrix calculation based on functional reuse as a part of wireless receiver in a Long Term Evolution (LTE) wireless system.

44 Claims, 10 Drawing Sheets

RECURSIVE IMPLEMENTATION FOR CALCULATION OF WHITENING MATRIX

CLAIM OF PRIORITY UNDER 35 U.S.C. §119

The present Application for patent claims benefit of U.S. Provisional Patent Application Ser. No. 61/333,612, entitled "Recursive Implementation to Calculate a Whitening Matrix", filed May 11, 2010, and assigned to the assignee hereof and hereby expressly incorporated by reference herein.

BACKGROUND

1. Field

Certain aspects of the present disclosure generally relate to wireless communications and, more particularly, to a method and apparatus for recursive implementation of whitening matrix calculation as a part of wireless receiver.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. The forward communication link and the reverse communication link may be established via a single-input single-output, multiple-input single-output or a multiple-input multiple-output system.

A wireless multiple-access communication system can support a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

SUMMARY

Certain aspects of the present disclosure provide a method for communications. The method generally includes receiving at least one incoming task, generating, based on the at least one incoming task, one or more parameter streams, obtaining one or more sequences using the one or more parameter streams, and computing a whitening matrix using the one or more sequences based on reusing one or more functions.

Certain aspects of the present disclosure provide an apparatus for communications. The apparatus generally includes a receiver configured to receive at least one incoming task, a first circuit configured to generate, based on the at least one incoming task, one or more parameter streams, a second circuit configured to obtain one or more sequences using the one or more parameter streams; and a third circuit configured to compute a whitening matrix using the one or more sequences based on reusing one or more functions.

Certain aspects of the present disclosure provide an apparatus for communications. The apparatus generally includes means for receiving at least one incoming task, means for generating, based on the at least one incoming task, one or more parameter streams, means for obtaining one or more sequences using the one or more parameter streams, and means for computing a whitening matrix using the one or more sequences based on reusing one or more functions.

Certain aspects of the present disclosure provide a computer program product. The computer program product generally includes a computer-readable medium comprising code for receiving at least one incoming task, generating, based on the at least one incoming task, one or more parameter streams, obtaining one or more sequences using the one or more parameter streams, and computing a whitening matrix using the one or more sequences based on reusing one or more functions.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
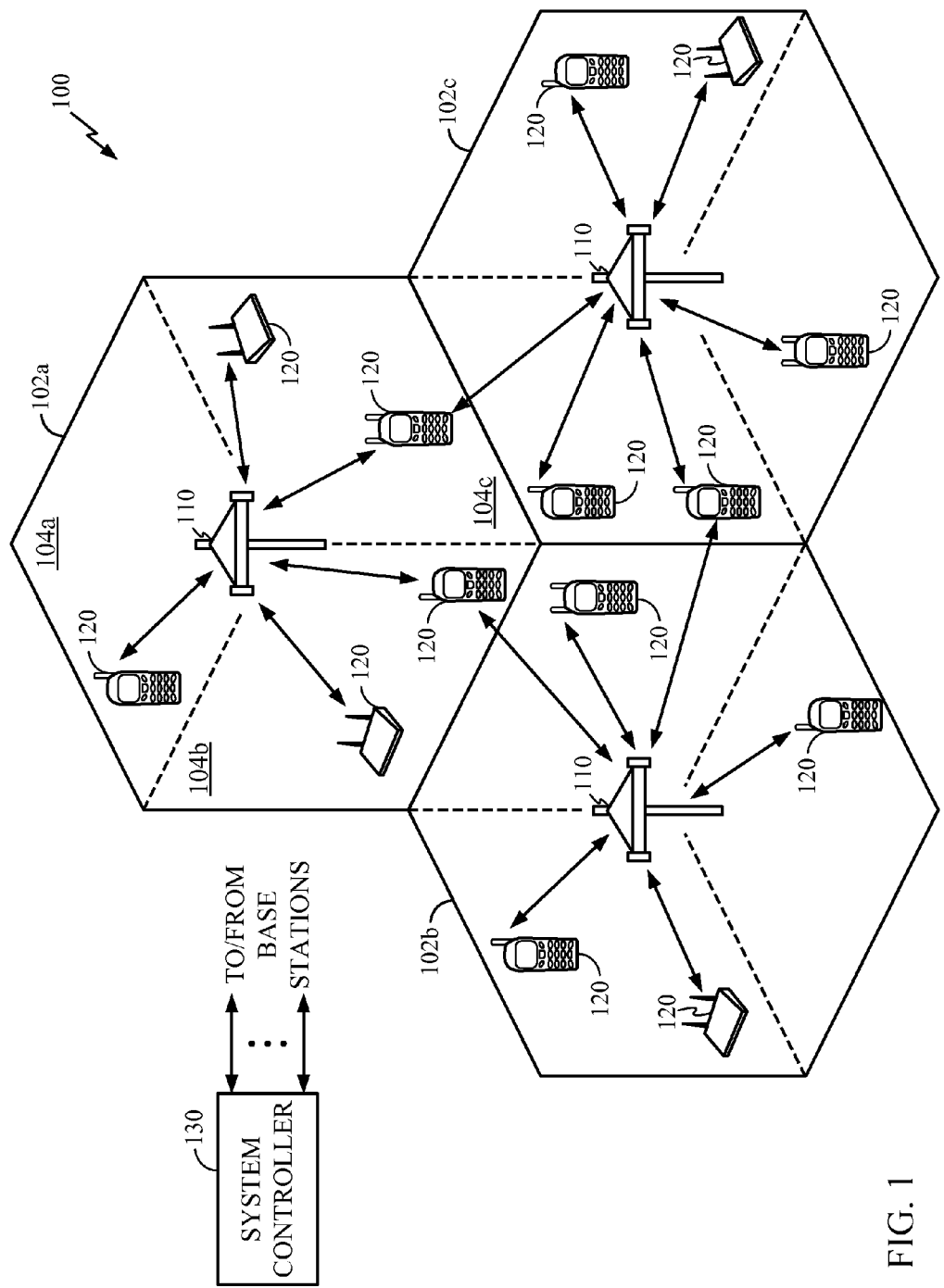
FIG. 1 illustrates a wireless communication system in accordance with certain aspects of the present disclosure.

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that use E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

An access point ("AP") may comprise, be implemented as, or known as NodeB, Radio Network Controller ("RNC"), eNodeB ("eNB"), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment ("UE"), a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

FIG. 1 illustrates a wireless communication system 100 with multiple base stations (BSs) 110 (e.g., wireless access points, wireless communication apparatus) and multiple terminals 120 (e.g., access terminals) that can be utilized in conjunction with one or more aspects of the present disclosure. A BS 110 is generally a fixed station that communicates with the terminals and can also be called an access point, a Node B, or some other terminology. Each BS 110 provides communication coverage for a particular geographic area or coverage area, illustrated as three geographic areas in FIG. 1, labeled 102a, 102b, and 102c. The term "cell" can refer to a BS or its coverage area depending on the context in which the term is used. To improve system capacity, a BS geographic area/coverage area can be partitioned into multiple smaller areas (e.g., three smaller areas, according to cell 102a in FIG. 1), 104a, 104b, and 104c. Each smaller area (104a, 104b, 104c) can be served by a respective base transceiver subsystem (BTS). The term "sector" can refer to a BTS or its coverage area depending on the context in which the term is used. For a sectorized cell, the BTSs for all sectors of that cell are typically co-located within the base station for the cell. The transmission techniques described herein can be used for a system with sectorized cells as well as a system with un-sectorized cells. For simplicity, in the subject description, unless specified otherwise, the term "base station" is used generically for a fixed station that serves a sector as well as a fixed station that serves a cell.

Terminals 120 are typically dispersed throughout the system, and each terminal 120 can be fixed or mobile. Each terminal 120 can be called a mobile station, user equipment, a user device, wireless communication apparatus, an access terminal, a user terminal or some other terminology. The terminal 120 can be also a wireless device, a cellular phone, a personal digital assistant (PDA), a wireless modem card, and so on. Each terminal 120 can communicate with zero, one, or multiple BSs 110 on the downlink (e.g., forward link) and uplink (e.g., reverse link) at any given moment. The downlink refers to the communication link from the base stations to the terminals, and the uplink refers to the communication link from the terminals to the base stations.

For a centralized architecture, a system controller 130 couples to the BSs 110 and provides coordination and control for the BSs 110. For a distributed architecture, the BSs 110 can communicate with one another as needed (e.g., by way of a wired or wireless backhaul network communicatively coupling the BSs 110). Data transmission on the forward link often occurs from one access point to one access terminal at or near the maximum data rate that can be supported by the forward link or the communication system. Additional channels of the forward link (e.g., control channel) can be transmitted from multiple access points to one access terminal. Reverse link data communication can occur from one access terminal to one or more access points.

In an aspect of the present disclosure, interference may be estimated at each terminal 120. The interference may originate from at least one of: one or more BSs 110 of one or more neighboring cells, or from one or more other terminals 120. The estimated interference may be then utilized at the terminal 120 for computing a whitening matrix as a part of whitened minimum mean square error (MMSE) receiver of the terminal 120. In another aspect of the present disclosure, interference may be also estimated at each BS 110, wherein the interference may originate from one or more neighboring cells. The estimated interference may be then utilized at the BS 110 for computing a whitening matrix as a part of whitened MMSE receiver of the BS 110.

Figure 2:
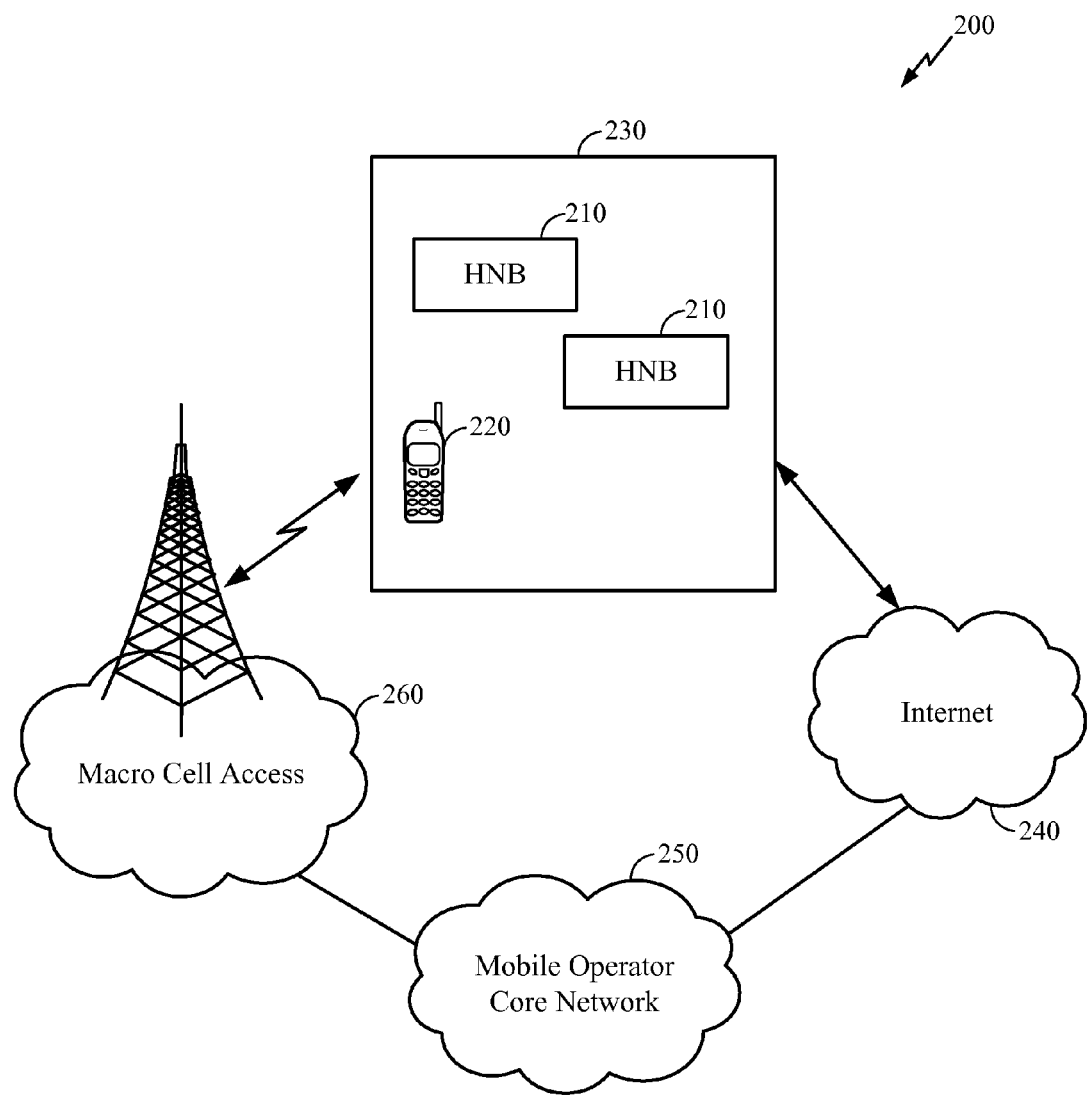
FIG. 2 illustrates a planned or semi-planned wireless communication environment in accordance with certain aspects of the present disclosure.

FIG. 2 is an illustration of a planned or semi-planned wireless communication environment 200, in accordance with various aspects of the present disclosure. The communication environment 200 may comprise multiple access point BSs comprising HNBs (Home NodeBs) 210, each of which may be installed in corresponding small scale network environments. Examples of small scale network environments may comprise user residences, places of business, indoor/outdoor facilities 230, and so on. The HNBs 210 can be configured to serve associated UEs 220 (e.g., included in a Closed Subcarrier Group (CSG) associated with the HNBs 210), or optionally alien or visitor UEs 220 (e.g., that are not configured for the CSG of the HNBs 210). Each HNB 210 may be further coupled to an Internet 240 and a mobile operator core network 250 via a Digital Subscriber Line (DSL) router (not shown), or, alternatively, a cable modem, broadband over power line connection, satellite Internet connection, or a like broadband Internet connection (not shown).

To implement wireless services via the HNBs 210, an owner of the HNBs 210 can subscribe to mobile services, such as 3G mobile services, offered through the mobile operator core network 250. Also, UE 220 can be capable to operate in a macro cellular environment and/or in a residential small scale network environment, utilizing various techniques described herein. Thus, at least in some disclosed aspects, HNB 210 can be backward compatible with any suitable existing UE 220. Furthermore, in addition to a macro cell mobile network 260, the UE 220 may be served by a predetermined number of HNBs 210, specifically HNBs 210 that reside within a corresponding user residence(s), place(s) of business, or indoor/outdoor facilities 230, and cannot be in a soft handover state with the macro cell mobile network 260 of the mobile operator core network 250. It should be appreciated that although aspects described herein employ 3GPP terminology, it is to be understood that the aspects can also be applied to 3GPP technology (Release 99 [Rel99], Rel5, Rel6, Rel7, Rel8, Rel9), as well as 3GPP2 technology (1xRTT, 1xEV-DO Rel10, RevA, RevB) and other known and related technologies.

In an aspect of the present disclosure, interference may be estimated at the UE 220, wherein the interference may originate from one or more HNBs 210 serving one or more other UEs. The estimated interference may be then used at the UE 220 for computing a whitening matrix within a whitened MMSE receiver of the UE 220. In another aspect of the present disclosure, interference estimation may be also performed at any of the HNB 210, wherein the interference may originate from one or more other HNBs 210. The estimated interference may be then utilized at that HNB 210 for computing a whitening matrix within a whitened MMSE receiver of that HNB 210.

Systems for Computation of Whitening Matrix

Figure 3:
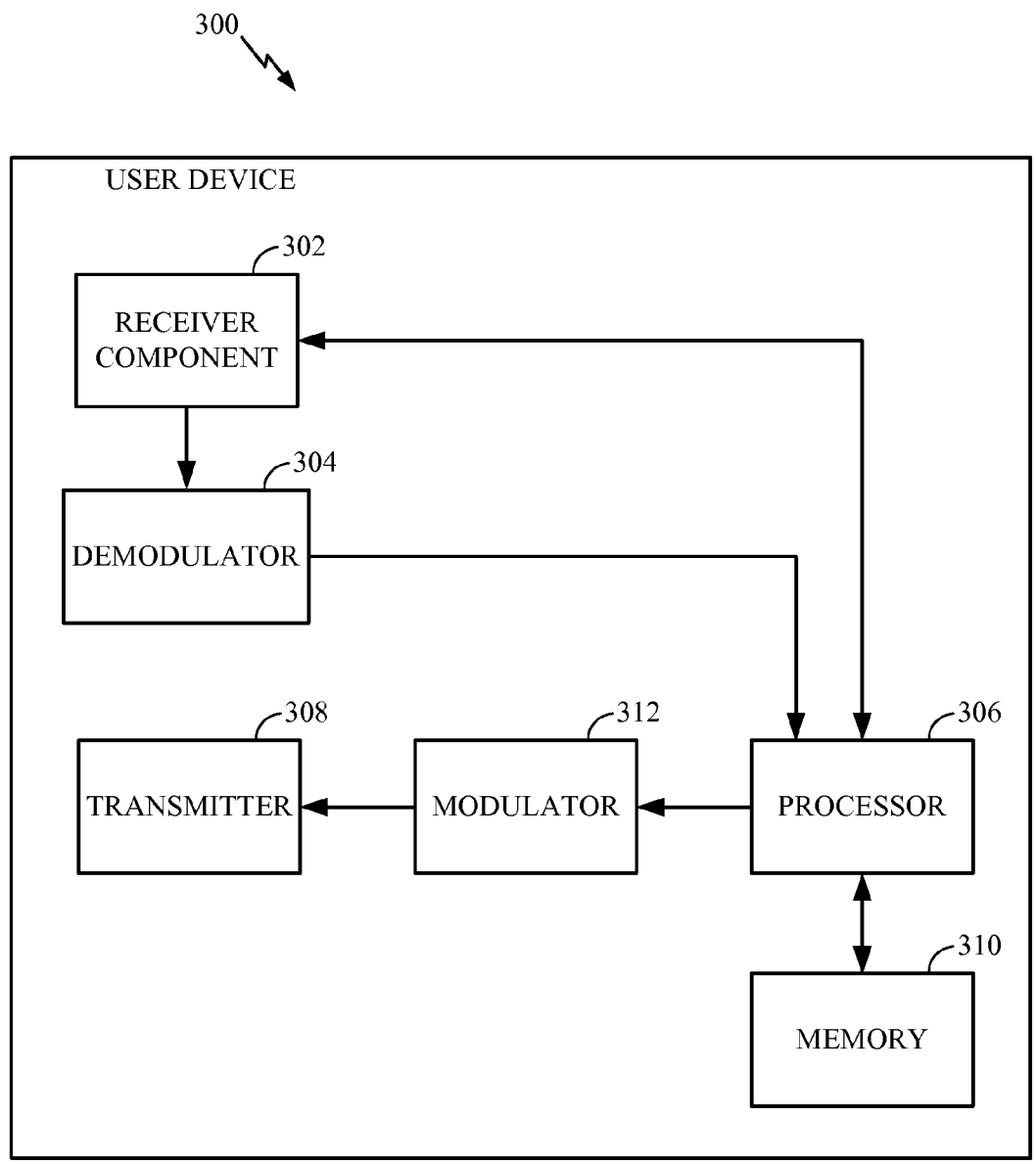
FIG. 3 illustrates an example of a system that facilitates estimation of interference and computation of whitening matrix in accordance with certain aspects of the present disclosure.

With reference now to FIG. 3, illustrated is a system 300 that facilitates estimation of interference and computation of a whitening matrix in accordance with one or more of the disclosed aspects. In an aspect of the present disclosure, the system 300 may reside in a user device. The system 300 may comprise a receiver component 302 that can receive a signal from, for example, a receiver antenna. The receiver component 302 can perform typical actions thereon, such as filtering, amplifying, downconverting (i.e., conditioning) of the received signal. The receiver component 302 can also digitize the conditioned signal to obtain samples. A demodulator 304 can obtain received symbols for each symbol period, as well as to provide received symbols to a processor 306.

The processor 306 can be a processor dedicated to analyzing information received by the receiver component 302 and/or generating information for transmission by a transmitter 308. In addition or alternatively, the processor 306 can control one or more components of the system 300, analyze information received by the receiver component 302, generate information for transmission by the transmitter 308, and/or control one or more components of the system 300. The processor 306 may comprise a controller component capable of coordinating communications with additional user devices. In an aspect of the present disclosure, the processor 306 may be capable of computing a whitening matrix based on interference estimates. The whitening matrix may be then used by the receiver component 302 for filtering of the received signal.

The system 300 can additionally comprise a memory 310 operatively coupled to the processor 306. The memory 310 can store information related to coordinating communications and any other suitable information. The memory 310 can additionally store protocols associated with interference estimation, as well as the whitening matrix computed by the processor 306. The system 300 can further comprise a symbol modulator 312, wherein the transmitter 308 transmits the modulated signal.

Figure 4:
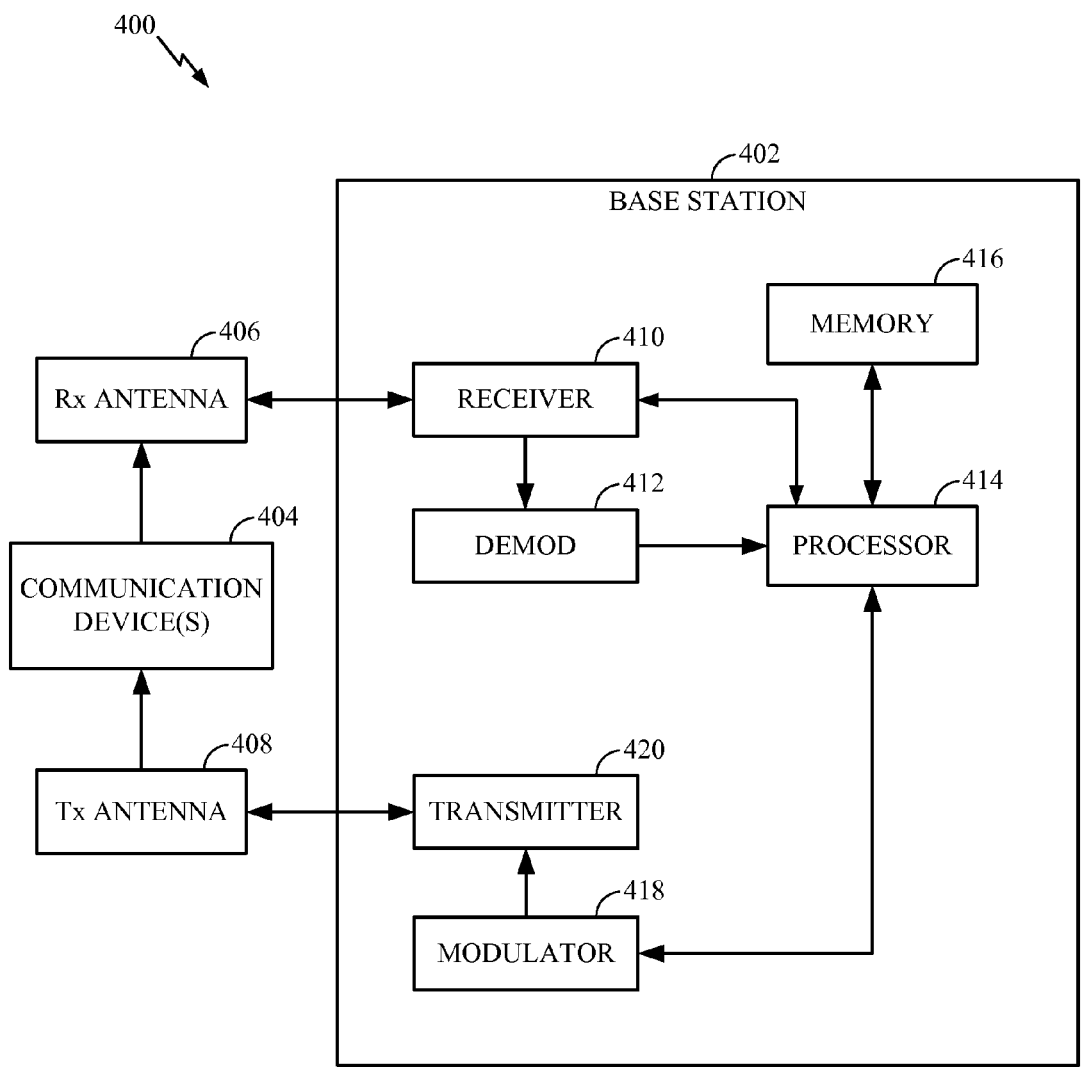
FIG. 4 illustrates an example of another system that facilitates estimation of interference and computation of whitening matrix in accordance with certain aspects of the present disclosure.

FIG. 4 is an illustration of a system 400 that facilitates estimation of interference and computation of a whitening matrix in accordance with various aspects presented herein. The system 400 may comprise an access point or a base station 402. As illustrated, the base station 402 may receive signal(s) from one or more communication devices 404 (e.g., user device) by a receive antenna 406, and transmits to one or more communication devices 404 through a transmit antenna 408.

The base station 402 may comprise a receiver 410 that receives information from the receive antenna 406 and may be operatively associated with a demodulator 412 that demodulates received information. Demodulated symbols may be analyzed by a processor 414. In an aspect of the present disclosure, the processor 414 may be capable of computing a whitening matrix based on interference estimates. The whitening matrix may be then used by the receiver component 410 for filtering of the received signal. The processor 414 may be coupled to a memory 416 that stores information related to estimation of interference, as well as the whitening matrix computed by the processor 414. A modulator 418 can multiplex the signal for transmission by a transmitter 420 through the transmit antenna 408 to the communication devices 404.

Figure 5:
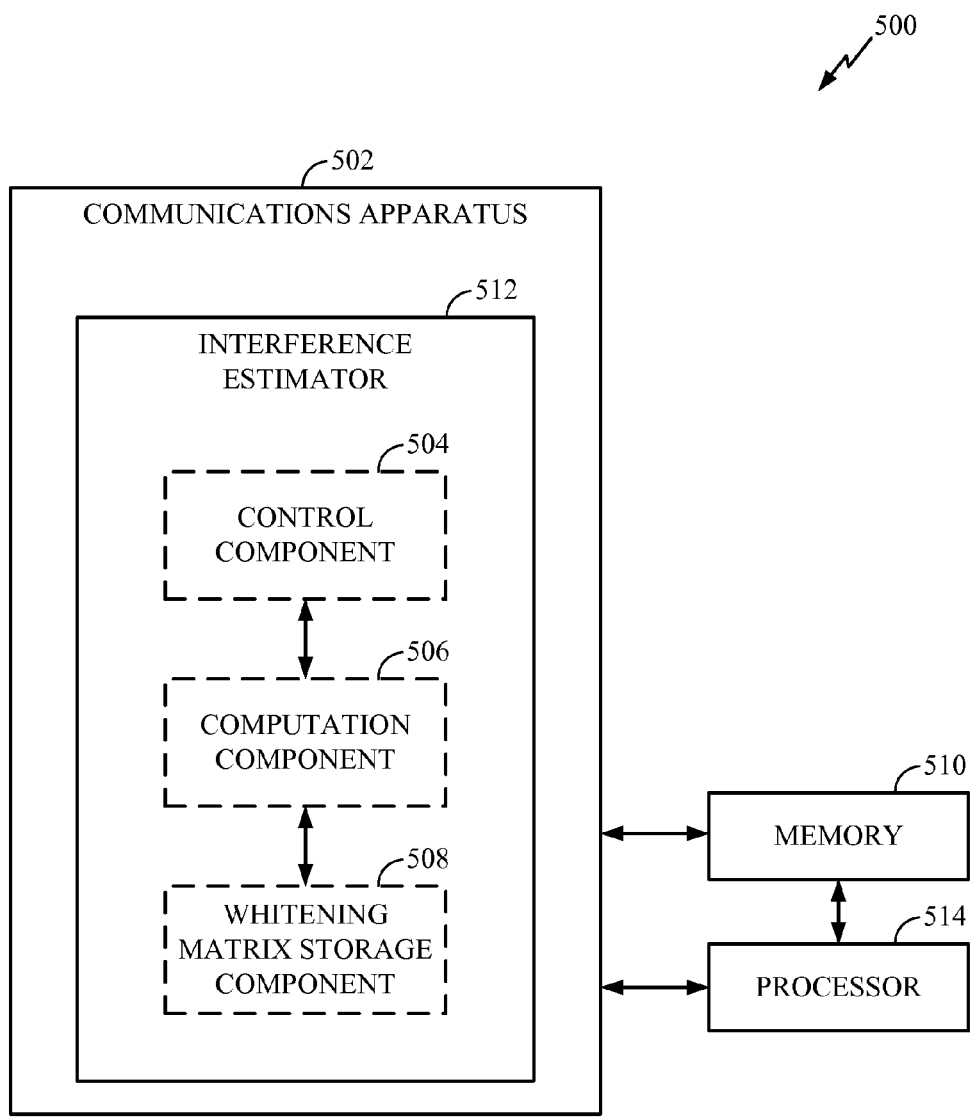
FIG. 5 illustrates a system that includes a wireless communications apparatus that may perform interference estimation and whitening matrix computation in a wireless communications environment in accordance with certain aspects of the present disclosure.

With reference to FIG. 5, illustrated is a system 500 that comprises a wireless communications apparatus 502, which may be designed to perform interference estimation and computation of a whitening matrix as a part of a whitened MMSE receiver. In an aspect of the present disclosure, the system 500 may be configured to perform full Cholesky decomposition of a matrix associated with interference estimates for computing the whitening matrix. In an aspect, the interference estimation matrix may be of size 4×4, if four receive antennas are associated with the wireless communications apparatus 502.

Typically, mathematical operations of the Choelsky matrix decomposition may be complicated to be performed only in hardware. Thus, in one approach, matrix elements may be sent to a software digital signal processor (DSP), which would then execute the matrix decomposition and provide results. However, this approach may require an order of magnitude more time than the hardware solution. The software based DSP may be too slow to produce in time resulting matrices due to passing of a large amount of data back and forth. Therefore, the software based approach may not meet latency requirements that can be provided with the disclosed aspects (e.g., latency requirements of a Long Term Evolution (LTE) wireless system). Another alternative approach may be to simplify the required mathematical operations or to use approximations of the mathematical operations and compromise the matrix decomposition algorithm. The drawback of this approach is that performance may be sacrificed for simplicity.

Certain aspects of the present disclosure support an approach for implementing the full 4×4 Cholesky matrix decomposition for whitening matrix computation purely in hardware without any simplifications and approximations. The disclosed aspects of the present disclosure may be able to perform the matrix decomposition in a timely manner (e.g., under about 70 modem clock cycles). Further, the disclosed aspects may perform the matrix decomposition in an efficient manner even though many complicated mathematical operations are performed for calculation of the whitening matrix, such as square root operations and divisions.

The system 500 may comprise the wireless communications apparatus 502 configured to perform in hardware various mathematical operations associated with the Cholesky matrix decomposition. The wireless communications apparatus 502 may be designed in an effort to optimize area cost and a number of clock cycles required to perform the mathematical operations for computing the whitening matrix. Further, the wireless communications apparatus 502 may perform all operations completely in hardware, wherein software may only queue up tasks for the hardware, so the tasks may be performed in an appropriate sequence.

Mathematical operations associated with the Cholesky matrix decomposition and whitening matrix computation may be broken down into several mathematical functions, and the wireless communications apparatus 502 may be designed such that to repeatedly execute these functions in a loop until the complete whitening matrix is formed. Further, the design may be memoryless, apart from temporary holding registers for storing intermediate values. Additionally, a single whitening matrix may be produced in less than 70 system clock cycles, which may be fast enough to meet latency requirements. This may be achieved despite the fact that the number of required mathematical operations may be high, while several of these operations may be complicated mathematical operations (e.g., square root operations and divisions).

The wireless communications apparatus 502 may further comprise a control component 504 that may be configured to receive incoming tasks and generate parameter streams based on the incoming tasks. In an aspect of the present disclosure, the generated parameter streams may comprise streams for reading at least one of channel estimates, reference signal generator sequences or antenna samples. The control component 504 may be also configured to generate at least one address for storing one or more computed elements of the whitening matrix.

The wireless communications apparatus 502 may also comprise a computation component 506 that may be configured to compute a whitening matrix for each incoming subframe. The results may be stored or retained in a whitening matrix storage component 508. In accordance with some aspects, the results may be stored in a memory 510 that may be used for various other functions associated with the wireless communications apparatus 502.

The computation component 506 may be configured to perform the whitening matrix calculation. The component 506 may be also configured to receive a reference signal sequence, antenna sample data, and channel estimates based on which the whitening matrix may be calculated. A further input to the computation component 506 may be a static antenna count. In accordance with some aspects, the control component 504, the computation component 506, the whitening matrix storage component 508, and/or other components may be part of an interference estimator 512, as illustrated in FIG. 5.

As aforementioned, the control component 504 may receive incoming tasks and generate parameter streams for reading at least one of channel estimates, the reference signal generator sequences or the antenna samples that may be previously stored in the memory 510. Further, the control component 504 may generate a fourth outgoing stream, i.e., the sequence of memory addresses for storing the computed whitening matrix in either the whitening matrix storage component 508 or in the memory 510.

The computation component 506 may be configured to receive, from the control component 504, one or more streams (e.g., at least one of the channel estimates, the reference signal sequence, and the antenna sample data) and produce a single whitening matrix stream output. Once the last whitening matrix has been computed, the completed output signal may be sent for further processing by the wireless communications apparatus 502.

To produce the single whitening matrix stream output, the computation component 506 may receive, de-rotate and re-order/re-organize channel estimates in accordance with mode/task data fields received with the channel estimate side-pipe. Received antenna samples may be re-ordered/re-organized. Reference signal generator values may be received/replicated, as required. The computation component 506 may calculate interference estimations and generate data tracking counters to control downstream resource block averaging and whitening matrix repetition, as required. The tracking values may be then side-piped with the generated interference estimates.

The computation component 506 may calculate covariance interference matrix based on the interference estimates, and may convert elements of the covariance matrix estimation into "pseudo" floating point numbers. Further, the computation component 506 may perform Cholesky decomposition of the covariance interference matrix to obtain L values, L diagonal inverse values and L inverse product terms, wherein the L values may correspond to elements of a lower diagonal matrix obtained by decomposing the covariance interference matrix. In an aspect of the present disclosure, the computation component 506 may calculate the whitening matrix based on at least one of the L values, the L diagonal inverse values or the L inverse product terms. More details about the Cholesky decomposition and implementation based on reusing of one or more functional units are disclosed in the following section of the present disclosure.

Elements of the whitening matrix may be de-normalized by removing exponent values generated during normalization performed as a part of the Cholesky decomposition. Further, the computed whitening matrix may be de-serialized to provide a full matrix in parallel for storage into the whitening matrix storage component 508. The resulting whitening matrix may be also sent into a single output stream.

The system 500 may comprise the memory 510 operatively coupled to the wireless communications apparatus 502. The memory 510 may be external to the wireless communications apparatus 502 or may reside within the wireless communications apparatus 502. The memory 510 may store information related to receiving at least one incoming task, generating the aforementioned parameter streams, producing a single whitening matrix stream based on the parameter streams, and outputting the single whitening matrix stream.

In accordance with some aspects, the memory 510 may comprise instructions related to generating streams for reading at least one of channel estimates, reference signal generator sequences, or antenna samples. According to some aspects, the memory 510 may further comprise instructions related to generating an output stream comprising a sequence of addresses for storing a whitening matrix into the whitening matrix storage component 508.

In accordance with some aspects, the memory 510 may further comprise instructions related to sending a completion output signal indicating that a complete set of whitening matrices is computed and stored. According to some aspects, the memory 510 may further comprise instructions related to storing the complete set of whitening matrices in a permuted order to allow sequential readings. In accordance with some aspects, the memory 510 may further comprise instructions related to calculating interference estimates, calculating a covariance matrix estimates based on the interference estimates, converting the covariance matrix estimates into pseudo floating point numbers, calculating L values, L diagonal inverse values and L inverse product terms by performing Cholesky decomposition of the covariance matrix, reducing bit-width representation of numbers during mathematical operations of the Cholesky decomposition, calculating whitening matrix values based on the obtained L values, de-normalizing elements of the whitening matrix, de-serializing the whitening matrix, and sending the whitening matrix into an output stream.

The memory 510 may further store protocols associated with interference estimation, taking action to control communication between the wireless communications apparatus 502 and other nodes or devices, such that the system 500 may employ stored protocols and/or algorithms to achieve improved communications in a wireless network as described herein. It should be appreciated that data store components described herein (e.g., memories) can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

At least one processor 514 may be operatively connected to the wireless communications apparatus 502 (and/or the memory 510) to facilitate analysis of information related to interference estimation and whitening matrix computation in a communication network. The processor 514 may be a processor dedicated to analyzing and/or generating information received by the wireless communications apparatus 502, a processor that controls one or more components of the system 500, and/or a processor that both analyzes and generates information received by the wireless communications apparatus 502 and controls one or more components of the system 500.

In accordance with some aspects of the present disclosure, the processor 514 may be configured to estimate interference and compute a whitening matrix from the estimated interference. The processor 514 may comprise a first module that receives at least one incoming task and a second module that generates the aforementioned parameter streams. The processor 514 may also comprise a third module that produces a single whitening matrix stream based on the parameter streams and a fourth module that outputs the single whitening matrix stream. In accordance with some aspects, the processor 514 may comprise a fifth module that stores a complete set of whitening matrices in a permuted order to allow sequential readings.

Implementation of Whitening Matrix Calculation with Functional Reuse

Certain aspects of the present disclosure support implementation of whitening matrix calculation purely in hardware based on reusing of hardware units configured to perform certain functions. In an aspect of the present disclosure, whitening of a received signal may be an integral part of wireless receiver, such as a whitened minimum mean square error (MMSE) receiver.

For next generation wireless systems, antenna arrays may be deployed for both mobile and base stations. The antenna arrays may enable advanced transmission/reception techniques such as Single User Multiple-Input Multiple-Output (SU-MIMO), Spatial Division Multiple Access (SDMA), and so on. For Long Term Evolution (LTE) systems, Multiple-Input Multiple-Output (MIMO) techniques are considered for both uplink and downlink in time division duplex (TDD) and frequency division duplex (FDD) systems. Different antenna array configurations may result in different signal and noise correlations among antennas. The correlation level may depend on at least one of antenna array geometry and antenna polarizations, or propagation environments and channel properties. A preferred receiver in terms of error rate performance may be the whitened MMSE receiver, which may be also able to exploit the antenna and noise correlations for achieving a maximal possible throughput.

For commercial systems, pairs of cross-polarized antennas and closely spaced linear antenna arrays are commonly used antenna configurations. The cross-polarized antenna arrays may be used to minimize antenna correlations. This may be common for systems with MIMO techniques or diversity techniques. On the other hand, the closely spaced linear antenna arrays may be used in systems with beam forming techniques. This may be common for TDD systems where channel reciprocity between uplink and downlink can be exploited for beam forming. In the present disclosure, a preferred receiver structure for any channel/noise correlations is first described, and then implementation details are disclosed.

A receiver algorithm may be based on following blocks: noise variance estimation, whitening filter calculation, channel and noise whitening, MIMO MMSE receiver processing, demodulation and decoding. From communication theory point of view, the whitened MMSE receiver may be optimal receiver for systems with both colored and white noise. However, there can be two design challenges: complexity of the whitening filter calculation, and stability of the whitening filter calculation from both fixed-point design perspective and ill-conditioned matrix inversion perspective. The present disclosure proposes solutions for these two problems.

Certain aspects of the present disclosure evaluate the following two numerical techniques to simplify calculation of the whitening matrix: Cholesky decomposition based technique with functional reuse, and iterative algorithm with functional reuse. The proposed hardware implementation may be efficient in terms of area cost and latency because of reusing certain functional blocks. Further, a rank based algorithm for resolving the aforementioned stability issues is proposed in the present disclosure. The presented approach may represent a general solution for a matrix of any rank.

In one aspect of the present disclosure, a whitening matrix may be calculated based on results of the Cholesky decomposition of an interference (noise) covariance matrix averaged over a plurality of tones. In an exemplary case, there may be four receive antennas at a receiving wireless device where the calculation of whitening matrix occurs.

Interference estimates may be first computed at the receiving wireless device by utilizing at least one of channel estimates, reference signal generator sequences or antenna samples. Then, the interference covariance matrix may be formed comprising the computed interference estimates. The interference covariance matrix R may be decomposed according to the Cholesky decomposition as:

$$R = \begin{bmatrix} \psi_{00} & \psi_{01} & \psi_{02} & \psi_{03} \\ \psi_{10} & \psi_{11} & \psi_{12} & \psi_{13} \\ \psi_{20} & \psi_{21} & \psi_{22} & \psi_{23} \\ \psi_{30} & \psi_{31} & \psi_{32} & \psi_{33} \end{bmatrix} = LL^H, \quad (1)$$

where L may be a lower diagonal matrix of size 4×4 with non-zero elements computed as:

$$l_{00} = \sqrt{\psi_{00}}, \; l_{10} = \psi_{10}\frac{1}{l_{00}}, \; l_{20} = \psi_{20}\frac{1}{l_{00}}, \; l_{30} = \psi_{30}\frac{1}{l_{00}}, \quad (2)$$

$$l_{11} = \sqrt{\psi_{11} - l_{10}^2}, \; l_{21} = \frac{1}{l_{11}}(\psi_{21} - l_{20}l_{10}^*),$$

-continued $$l_{31} = \frac{1}{l_{11}}(\psi_{31} - l_{30}l_{10}^*), \; l_{22} = \sqrt{\psi_{22} - l_{20}^2 - l_{21}^2},$$

$$l_{32} = \frac{1}{l_{22}}(\psi_{32} - l_{30}l_{20}^* - l_{31}l_{21}^*), \; l_{33} = \sqrt{\psi_{33} - (l_{30}^2 + l_{31}^2 + l_{32}^2)}.$$

The whitening matrix W may be then computed as an inverse of the lower diagonal matrix L with elements given by equation (2):

$$W = L^{-1} \quad (3)$$

$$= \begin{bmatrix} \frac{1}{l_{00}} & 0 & 0 & 0 \\ -\frac{l_{10}}{l_{00}l_{11}} & \frac{1}{l_{11}} & 0 & 0 \\ l_{sumi}\begin{pmatrix} l_{33}l_{21}l_{10} - \\ l_{33}l_{20}l_{11} \end{pmatrix} & -\frac{l_{21}}{l_{11}l_{22}} & \frac{1}{l_{22}} & 0 \\ l_{sumi}\begin{pmatrix} l_{11}l_{20}l_{32} - \\ l_{11}l_{22}l_{30} + \\ l_{10}l_{22}l_{31} - \\ l_{10}l_{21}l_{32} \end{pmatrix} & l_{sumi}\begin{pmatrix} l_{00}l_{21}l_{32} - \\ l_{00}l_{22}l_{31} \end{pmatrix} & -\frac{l_{32}}{l_{22}l_{33}} & \frac{1}{l_{33}} \end{bmatrix}$$

After exploring the structure of calculations given by equations (2) and (3), it can be shown that the computation of whitening matrix may be efficiently implemented using several function calls. These functions may be defined as:

$$A(a_0, a_1, a_2, a_3) = \sqrt{\text{real}(a_0) - (a_1^2 + a_2^2 + a_3^2)}, \; B(b) = \frac{1}{b}, \quad (4)$$

$$C(c_0, c_1, c_2, c_3, c_4, c_5) = c_0 \cdot (c_1 - c_2c_3^* - c_4c_5^*), \text{ and}$$

$$D(d_0, d_1, d_2, d_3, d_4) = (d_0d_1 - d_2d_3) \cdot d_4.$$

Figure 6A:
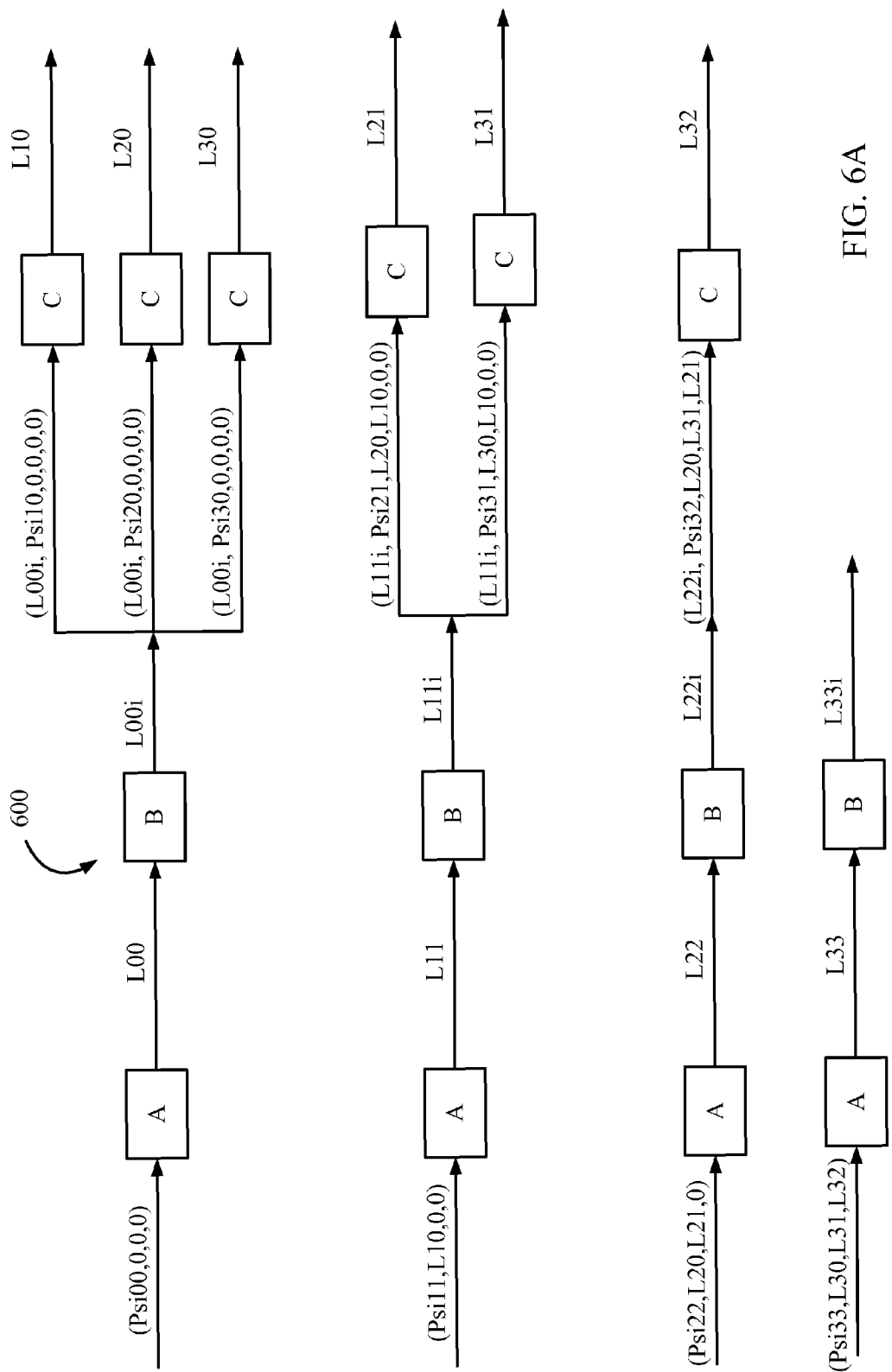
FIG. 6 illustrates an example block diagram for computation of whitening matrix based on functional reuse in accordance with certain aspects of the present disclosure.
Figure 6B:
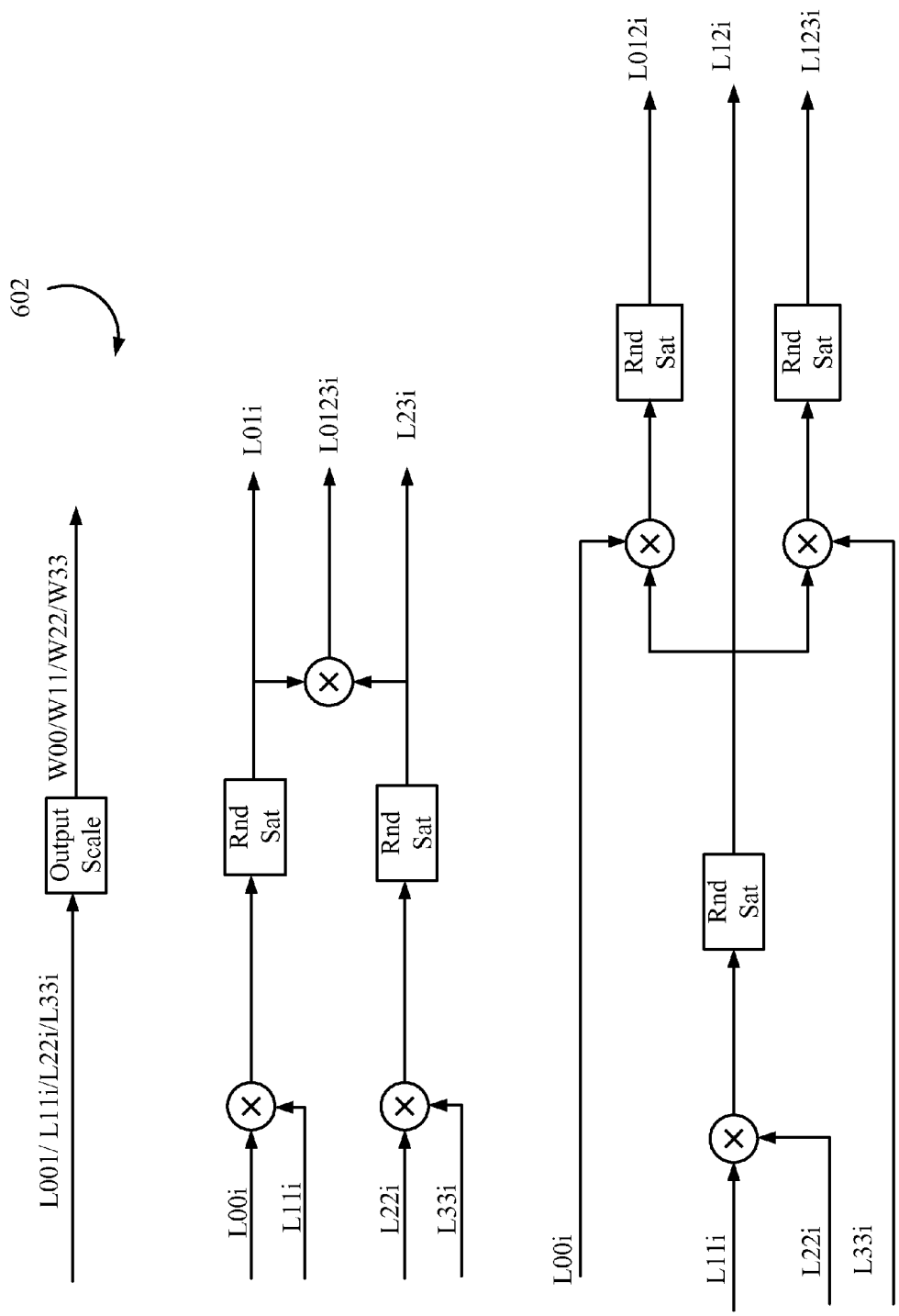
Figure 6C:
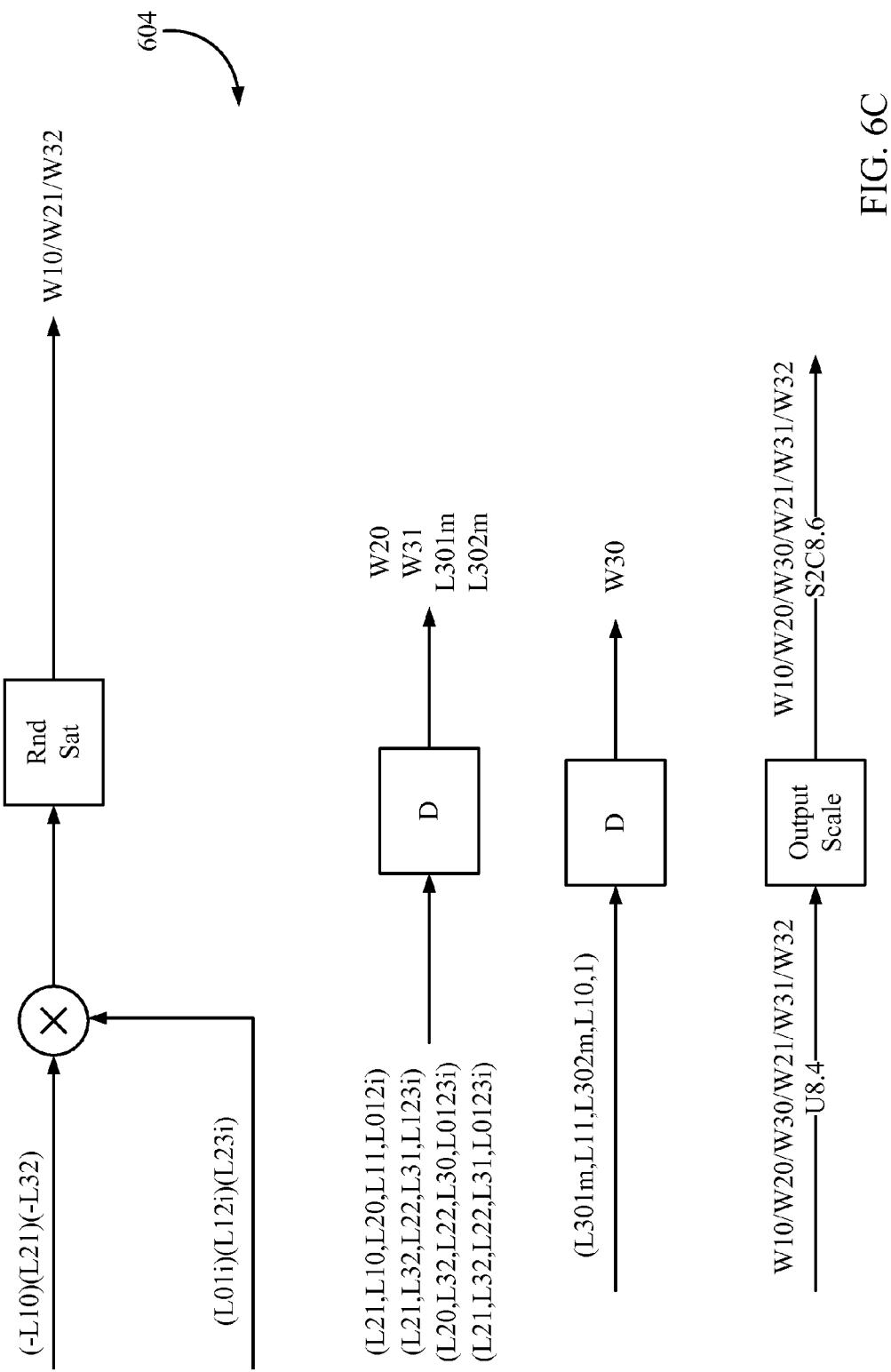

FIGS. 6A-6C illustrate example block diagrams 600, 602, 604 for calculating the whitening matrix defined by equation (3) based on the function calls defined by equation (4). For certain aspects of the present disclosure, the whitening matrix calculation illustrated by the block diagrams 600, 602, 604 may be implemented at the processor 306 of the system 300 from FIG. 3 and/or at the processor 414 of the base station 402 from FIG. 4 and/or at the computation component 506 of the communications apparatus 502 from FIG. 5.

All the functional blocks illustrated in FIG. 6A and in FIG. 6C may not be implemented in hardware. Instead, in an aspect of the present disclosure, only a subset of the functional units associated with each of the functions defined in equation (4) may be implemented in hardware and then reused (recycled) multiple times for performing operations illustrated in FIGS. 6A-6C. A level of parallelism (i.e., a number of functional units associated with the same function that operate simultaneously) may depend on a latency requirement (e.g., data throughput requirement).

In an aspect of the present disclosure, the whitening matrix may be calculated in a pipelined manner. For example, operations represented with the block diagram 604 may be performed simultaneously with operations represented with the block diagram 602 and with operations represented with the block diagram 600 for three different received data subframes.

In an aspect of the present disclosure, in case when one or more functional units are recycled (i.e., reused multiple times for computing elements of the same whitening matrix), new data may be incoming in the functional units while previously stored data may be processed in the same functional units. Therefore, certain arbitration for inputting new and old data into the functional units may need to be performed in order to generate accurate results for the whitening matrix calculation.

The present disclosure also proposes a rank dependent stability control of the whitening filter calculation illustrated in FIGS. 6A-6C. It can be observed from equations (3) and (4) and from FIG. 6A that four diagonal terms of the whitening matrix W from equation (3) may be computed by utilizing the function $A(a_0, a_1, a_2, a_3)$:

$$A(a_0, a_1, a_2, a_3) = \sqrt{\text{real}(a_0) - (a_1^2 + a_2^2 + a_3^2)} = \sqrt{S}. \quad (5)$$

For ill-conditioned 4×4 noise variance matrix, the term S within the square root of equation (5) may be either zero or negative due to fixed-point effects. Depending on the rank of the 4×4 noise variance matrix, this may happen for at least one of the second, third or fourth diagonal element of the whitening matrix.

It is proposed in the present disclosure to solve this problem by checking the condition of stability for each calculation of the function A. If the term S is positive, then full calculation of the function A defined by equation (5) may be performed, and the system rank may be increased by one. Otherwise, all negative sub-terms of the term S may be removed before calculating the function A, and the system rank may not increase. Then, the function A may become:

$$A(a_1, a_1, a_2, a_3) = \sqrt{\text{real}(a_0)}. \quad (6)$$

After all iterations of computing the whitening matrix are done, some elements of the whitening matrix may be zeroed out according to the system rank. Then, the output whitening matrix may comprise one of the following forms depending on the system rank (i.e., rank of the covariance matrix):

$$\begin{bmatrix} \frac{1}{l_{00}} & 0 & 0 & 0 \\ 0 & 0 & 0 & 0 \\ 0 & 0 & 0 & 0 \\ 0 & 0 & 0 & 0 \end{bmatrix}, \quad (7)$$

$$\begin{bmatrix} \frac{1}{l_{00}} & 0 & 0 & 0 \\ -\frac{l_{10}}{l_{00}l_{11}} & \frac{1}{l_{11}} & 0 & 0 \\ 0 & 0 & 0 & 0 \\ 0 & 0 & 0 & 0 \end{bmatrix}, \quad (8)$$

$$\begin{bmatrix} \frac{1}{l_{00}} & 0 & 0 & 0 \\ -\frac{l_{10}}{l_{00}l_{11}} & \frac{1}{l_{11}} & 0 & 0 \\ l_{sumi}\begin{pmatrix} l_{33}l_{21}l_{10} - \\ l_{33}l_{20}l_{11} \end{pmatrix} & -\frac{l_{21}}{l_{11}l_{22}} & \frac{1}{l_{22}} & 0 \\ 0 & 0 & 0 & 0 \end{bmatrix}, \text{ and} \quad (9)$$

$$\begin{bmatrix} \frac{1}{l_{00}} & 0 & 0 & 0 \\ -\frac{l_{10}}{l_{00}l_{11}} & \frac{1}{l_{11}} & 0 & 0 \\ l_{sumi}\begin{pmatrix} l_{33}l_{21}l_{10} - \\ l_{33}l_{20}l_{11} \end{pmatrix} & -\frac{l_{21}}{l_{11}l_{22}} & \frac{1}{l_{22}} & 0 \\ l_{sumi}\begin{pmatrix} l_{11}l_{20}l_{32} - \\ l_{11}l_{22}l_{30} + \\ l_{10}l_{22}l_{31} - \\ l_{10}l_{21}l_{32} \end{pmatrix} & l_{sumi}\begin{pmatrix} l_{00}l_{21}l_{32} - \\ l_{00}l_{22}l_{31} \end{pmatrix} & -\frac{l_{32}}{l_{22}l_{33}} & \frac{1}{l_{33}} \end{bmatrix}. \quad (10)$$

Therefore, according to equations (7)-(10), the rank of whitening matrix may be one (as defined by equation (7)), two (as defined by equation (8)), three (as defined by equation (9)) and four (as defined by equation (10)).

Certain aspects of the present disclosure support an iterative approach with functional reuse for whitening matrix calculation based on a block-structure of the covariance interference matrix defined by equation (1). A general covariance interference matrix R of size 4×4 may comprise the following block matrix form:

$$R = \begin{bmatrix} A & B' \\ B & C \end{bmatrix}, \quad (11)$$

where blocks A, B and C may represent matrices of size 2×2. Then, the computed whitening matrix W may comprise the following block matrix form:

$$W = \begin{bmatrix} W_0 & 0 \\ W_1 & W_2 \end{bmatrix}, \quad (12)$$

where blocks $W_0$, $W_1$ and $W_2$ may represent matrices of size 2×2.

In an aspect of the present disclosure, in the case of two receive antennas, a whitening matrix of size 2×2 may be computed from a covariance matrix of size 2×2 by utilizing a 2×2 whitening matrix engine F, i.e., W=F(R).

In another aspect of the present disclosure, in the case of four receive antennas, the whitening matrix defined by equation (12) of size 4×4 may be computed from the covariance matrix defined by equation (11), as follows. First, the 2×2 whitening matrix engine may be called to calculate the block $W_o$ using the block A defined in equation (11), i.e., $W_0$=F(A). Second, the inverse of block A may be calculated from $W_0$ as: $A^{-1} = W_0 \cdot W_0^H$. Third, a matrix E may be then calculated using the block B defined in equation (11) and the inverse of A as: $E = B \cdot A^{-1}$.

At the fourth step of computing the whitening matrix, a matrix D may be calculated as: $D = C - EB^H$. At the fifth step, the 2×2 whitening matrix engine may be called to calculate the block $W_2$ defined in equation (12), i.e., $W_2$=F(D). At the sixth step, the last remaining block $W_1$ of the whitening matrix defined by equation (12) may be calculated as: $W_1 = -W_2 \cdot E$. Therefore, in total, the 2×2 whitening matrix engine may be called twice in order to obtain the whitening matrix of size 4×4.

In view of exemplary systems shown and described above, methodologies that may be implemented in accordance with the disclosed subject matter, will be better appreciated with reference to various flow charts. While, for purposes of simplicity of explanation, methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g. device, system, process, component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 7:
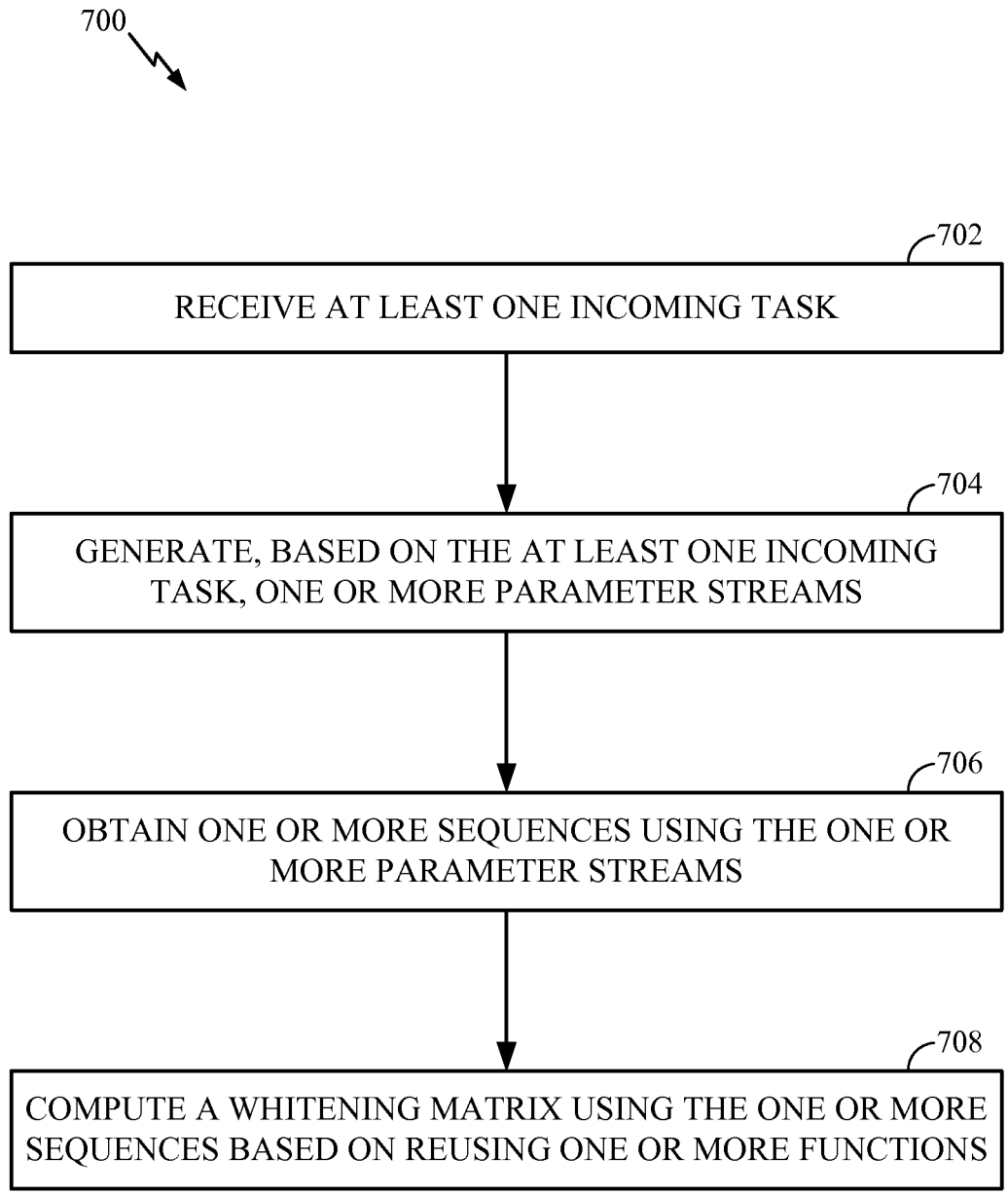
FIG. 7 is a functional block diagram conceptually illustrating example blocks that may be performed at a wireless device in accordance with certain aspects of the present disclosure.

FIG. 7 is a functional block diagram conceptually illustrating example blocks 700 executed at a wireless device (e.g., an access point or an access terminal) in accordance with certain aspects of the present disclosure. Operations illustrated by the blocks 700 may be executed, for example, at the processor 306 of the system 300 from FIG. 3, and/or at the processor 414 of the base station 402 from FIG. 4, and/or at the computation component 506 of the communications apparatus 502 from FIG. 5.

The operations may begin, at block 702, by receiving at least one incoming task. At block 704, based on the at least one incoming task, one or more parameter streams may be generated. At block 706, one or more sequences may be obtained using the one or more parameter streams. At block 708, a whitening matrix may be computed using the one or more sequences based on reusing one or more functions. In an aspect of the present disclosure, the one or more sequences may comprise channel estimates, a reference signal sequence and pilot samples. In another aspect, the one or more sequences may comprise input sequences (input samples) of the wireless device.

In an aspect, computing the whitening matrix may comprise computing a matrix of interference estimates based on the one or more sequences, and performing Cholesky decomposition of the matrix of interference estimates by reusing the one or more functions. Further, during the Cholesky decomposition, a rank value may be determined according to a rank of the matrix of interference estimates and one of the functions. In an aspect, one or more elements of the whitening matrix may be determined using the rank value, as given by equations (7)-(10). During the computation of the whitening matrix, operations may be performed utilizing pseudo floating point representation of numbers associated with the one or more sequences.

In an aspect, computing the whitening matrix may comprise computing a matrix of interference estimates based on the one or more sequences, and computing one or more sub-blocks of the whitening matrix (as defined by equation (12)) based on one or more sub-blocks of the matrix of interference estimates (as defined by equation (11)) by using multiple times at least one functional unit associated with one of the functions.

In one configuration, the apparatus 502 for wireless communication comprises means for receiving at least one incoming task, means for generating, based on the at least one incoming task, one or more parameter streams, means for obtaining one or more sequences using the one or more parameter streams and means for computing a whitening matrix based on the one or more sequences by reusing one or more functions. In one aspect, the aforementioned means may be the computation component 506 configured to perform the functions recited by the aforementioned means. In another aspect, the aforementioned means may be a module or any apparatus configured to perform the functions recited by the aforementioned means.

Figure 8:
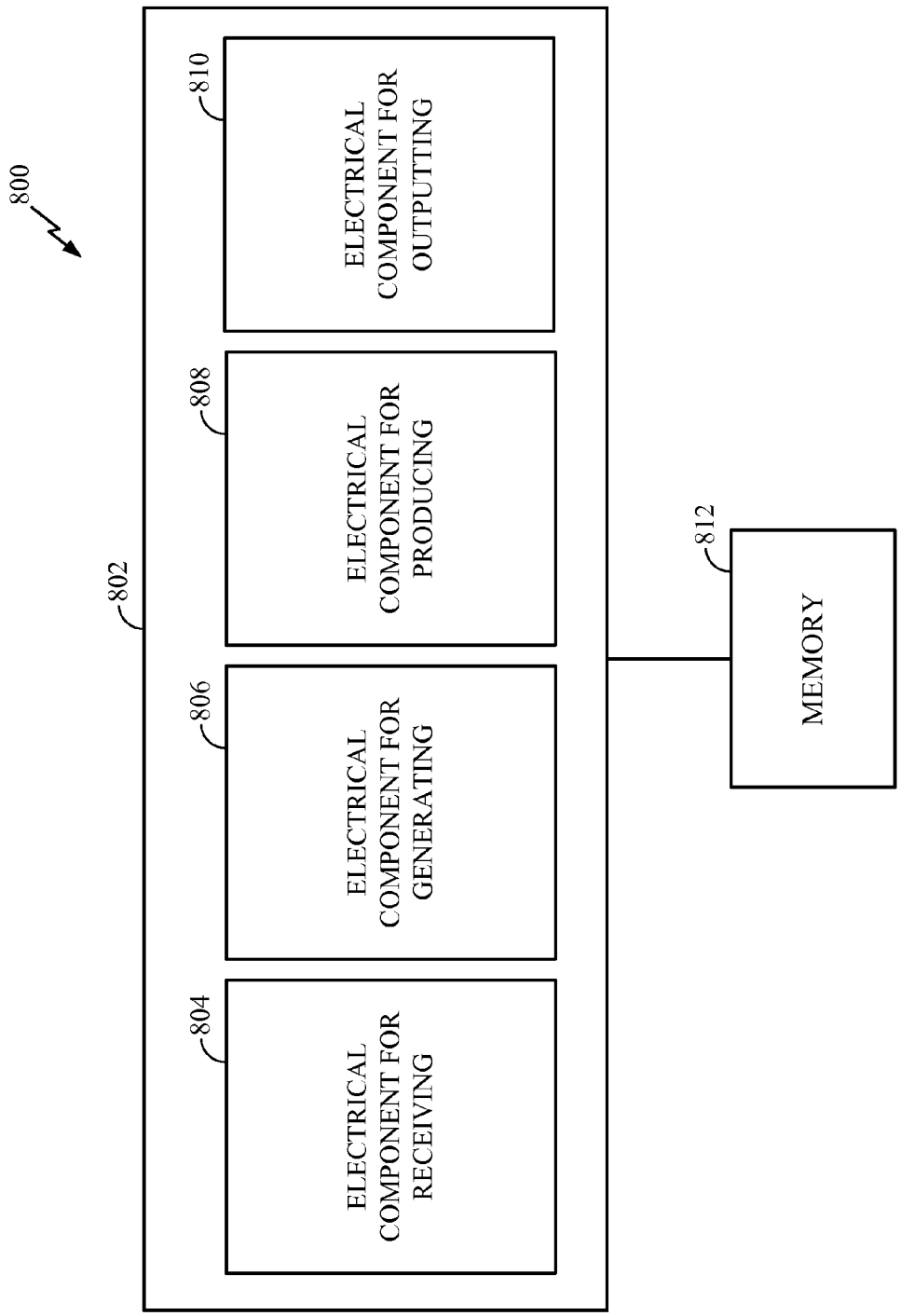
FIG. 8 illustrates an example system that estimates interference and computes a whitening matrix in accordance with certain aspects of the present disclosure.

With reference to FIG. 8, illustrated is an example system 800 that may estimate interference and compute a whitening matrix, according to various aspects of the present disclosure. It is to be appreciated that the system 800 is represented as including functional blocks, which may be functional blocks that represent functions implemented by a processor, software, or combination thereof (e.g., firmware).

The system 800 may comprise a logical grouping 802 of electrical components that can act separately or in conjunction. The logical grouping 802 may comprise an electrical component 804 for receiving at least one incoming task. The logical grouping 802 may also comprise an electrical component 806 for generating at least three parameter streams.

The logical grouping 802 may further comprise an electrical component 808 for producing a single whitening matrix stream based on the at least three parameter streams. The logical grouping 802 may also comprise an electrical component 810 for outputting the single whitening matrix stream.

In accordance with some aspects, the electrical component 806 may comprise an electrical component for generating parameter streams for reading channel estimates, reference signal generator sequences and antenna samples. According to some aspects, the electrical component 806 may comprise an electrical component for generating an output stream comprising a sequence of addresses for storing a whitening matrix.

In accordance with some aspects, the logical grouping 802 may comprise an electrical component for sending a completion output signal indicating that a complete set of whitening matrices is computed and stored. According to some aspects, the logical grouping 802 may comprise an electrical component for storing the complete set of whitening matrices in a permuted order to allow sequential readings.

According to some aspects, an electrical component 808 may comprise an electrical component for calculating interference estimates and an electrical component for calculating a covariance matrix based on the interference estimates. Also, the electrical component 808 may comprise an electrical component for converting the covariance matrix estimates into pseudo floating point and an electrical component for calculating L values, L diagonal inverse values and L inverse product terms by performing Cholesky decomposition of the covariance matrix. The electrical component 808 may also comprise an electrical component for calculating a whitening matrix values based on the obtained L values, L diagonal inverse values and L inverse product terms. The electrical component 808 may further comprise an electrical component for de-normalizing the whitening matrix values, an electrical component for de-serializing the whitening matrix, and an electrical component for sending the whitening matrix into an output stream.

Additionally, the system 800 may comprise a memory 812 that may comprise instructions for executing functions associated with the electrical components 804, 806, 808, and 810 or other components. While shown as being external to the memory 812, it is to be understood that one or more of the electrical components 804, 806, 808, 810 may exist within the memory 812.

In summary, two efficient implementations of whitening matrix calculation based on functional reuse as an integral part of MIMO receiver are proposed in the present disclosure. The present disclosure also proposes a general procedure to resolve numerical stability of ill-conditioned matrices. The general solutions may be used for arbitrary antenna configurations and any rank of the noise and interference covariance matrix. In an aspect of the present disclosure, the proposed algorithm may be implemented at a base station operating in a Long Term Evolution (LTE) wireless system for both data and control channel processing. In another aspect of the present disclosure, the proposed algorithm may be implemented at a user equipment of the LTE wireless system.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, a phrase referring to "at least one of" a list of items refers to any combination of those items, including single members. As an example, "at least one of: a, b, or c" is intended to cover: a, b, c, a-b, a-c, b-c, and a-b-c.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for communications, comprising:
receiving at least one incoming task;
generating, based on the at least one incoming task, one or more parameter streams;
obtaining one or more sequences using the one or more parameter streams; and
computing a whitening matrix using the one or more sequences based on reusing one or more functions.

2. The method of claim 1, further comprising:
outputting elements of the whitening matrix in a single stream.

3. The method of claim 1, wherein:
the one or more sequences comprise channel estimates, a reference signal sequence and pilot samples, and
the channel estimates, reference signal sequence and pilot samples are all in frequency domain.

4. The method of claim 3, further comprising:
using the channel estimates, reference signal sequence and pilot samples to compute the whitening matrix.

5. The method of claim 1, wherein computing the whitening matrix comprises:
   computing a matrix of interference estimates based on input sequences; and
   performing Cholesky decomposition of the matrix of interference estimates by reusing the one or more functions.

6. The method of claim 5, further comprising:
   determining, during the Cholesky decomposition, a rank value according to a rank of the matrix of interference estimates and one of the functions, wherein
   one or more elements of the whitening matrix are determined using the rank value.

7. The method of claim 1, further comprising:
   performing arbitration at a functional unit configured to execute one of the functions, if the functional unit is used multiple times for computing the whitening matrix.

8. The method of claim 1, wherein computing the whitening matrix comprises:
   performing operations utilizing pseudo floating point representation of numbers associated with the one or more sequences; and
   reducing bit-width representation of the numbers.

9. The method of claim 8, further comprising:
   after reducing the bit-width representation of numbers, de-normalizing elements of the whitening matrix.

10. The method of claim 1, wherein reusing the one or more functions comprises:
    using, multiple times for computing the whitening matrix, at least one functional unit associated with one of the functions.

11. The method of claim 1, wherein computing the whitening matrix comprises:
    computing a matrix of interference estimates based on the one or more sequences; and
    computing one or more sub-blocks of the whitening matrix based on one or more other sub-blocks of the matrix of interference estimates by using multiple times a functional unit associated with one of the functions.

12. An apparatus for communications, comprising:
    a receiver configured to receive at least one incoming task;
    a first circuit configured to generate, based on the at least one incoming task, one or more parameter streams;
    a second circuit configured to obtain one or more sequences using the one or more parameter streams; and
    a third circuit configured to compute a whitening matrix using the one or more sequences based on reusing one or more functions.

13. The apparatus of claim 12, further comprising:
    a fourth circuit configured to output elements of the whitening matrix in a single stream.

14. The apparatus of claim 12, wherein: the one or more sequences comprise channel estimates, a reference signal sequence and pilot samples, and
    the channel estimates, reference signal sequence and pilot samples are all in frequency domain.

15. The apparatus of claim 14, wherein the third circuit is also configured to:
    use the channel estimates, reference signal sequence and pilot samples to compute the whitening matrix.

16. The apparatus of claim 12, wherein the third circuit is also configured to:
    compute a matrix of interference estimates based on input sequences; and
    perform Cholesky decomposition of the matrix of interference estimates by reusing the one or more functions.

17. The apparatus of claim 16, further comprising:
    a fourth circuit configured to determine, during the Cholesky decomposition, a rank value according to a rank of the matrix of interference estimates and one of the functions, wherein
    one or more elements of the whitening matrix are determined using the rank value.

18. The apparatus of claim 12, further comprising:
    a fourth circuit configured to perform arbitration at a functional unit configured to execute one of the functions, if the functional unit is used multiple times for computing the whitening matrix.

19. The apparatus of claim 12, wherein the third circuit is also configured to:
    perform operations utilizing pseudo floating point representation of numbers associated with the one or more sequences; and
    reduce bit-width representation of the numbers.

20. The apparatus of claim 19, further comprising:
    a fourth circuit configured to de-normalize elements of the whitening matrix, after reducing the bit-width representation of numbers.

21. The apparatus of claim 12, wherein reusing the one or more functions comprises:
    using, multiple times for computing the whitening matrix, at least one functional unit associated with one of the functions.

22. The apparatus of claim 12, wherein the third circuit is also configured to:
    compute a matrix of interference estimates based on the one or more sequences; and
    compute one or more sub-blocks of the whitening matrix based on one or more other sub-blocks of the matrix of interference estimates by using multiple times a functional unit associated with one of the functions.

23. An apparatus for communications, comprising:
    means for receiving at least one incoming task;
    means for generating, based on the at least one incoming task, one or more parameter streams;
    means for obtaining one or more sequences using the one or more parameter streams; and
    means for computing a whitening matrix using the one or more sequences based on reusing one or more functions.

24. The apparatus of claim 23, further comprising:
    means for outputting elements of the whitening matrix in a single stream.

25. The apparatus of claim 23, wherein:
    the one or more sequences comprise channel estimates, a reference signal sequence and pilot samples, and
    the channel estimates, reference signal sequence and pilot samples are all in frequency domain.

26. The apparatus of claim 25, further comprising:
    means for using the channel estimates, reference signal sequence and pilot samples to compute the whitening matrix.

27. The apparatus of claim 23, wherein the means for computing the whitening matrix comprises:
    means for computing a matrix of interference estimates based on input sequences; and
    means for performing Cholesky decomposition of the matrix of interference estimates by reusing the one or more functions.

28. The apparatus of claim 27, further comprising:
    means for determining, during the Cholesky decomposition, a rank value according to a rank of the matrix of interference estimates and one of the functions, wherein one or more elements of the whitening matrix are determined using the rank value.

29. The apparatus of claim 23, further comprising:
means for performing arbitration at a functional unit configured to execute one of the functions, if the functional unit is used multiple times for computing the whitening matrix.

30. The apparatus of claim 23, wherein the means for computing the whitening matrix comprises:
means for performing operations utilizing pseudo floating point representation of numbers associated with the one or more sequences; and
means for reducing bit-width representation of the numbers.

31. The apparatus of claim 30, further comprising:
means for de-normalizing elements of the whitening matrix, after reducing the bit-width representation of numbers.

32. The apparatus of claim 23, wherein reusing the one or more functions comprises:
using, multiple times for computing the whitening matrix, at least one functional unit associated with one of the functions.

33. The apparatus of claim 23, wherein the means for computing the whitening matrix comprises:
means for computing a matrix of interference estimates based on the one or more sequences; and
means for computing one or more sub-blocks of the whitening matrix based on one or more other sub-blocks of the matrix of interference estimates by using multiple times a functional unit associated with one of the functions.

34. A computer program product, comprising a non-transitory computer-readable medium comprising code for:
receiving at least one incoming task;
generating, based on the at least one incoming task, one or more parameter streams;
obtaining one or more sequences using the one or more parameter streams; and
computing a whitening matrix using the one or more sequences based on reusing one or more functions.

35. The computer program product of claim 34, wherein the computer-readable medium further comprising code for:
outputting elements of the whitening matrix in a single stream.

36. The computer program product of claim 34, wherein:
the one or more sequences comprise channel estimates, a reference signal sequence and pilot samples, and
the channel estimates, reference signal sequence and pilot samples are all in frequency domain.

37. The computer program product of claim 36, wherein the computer-readable medium further comprising code for:
using the channel estimates, reference signal sequence and pilot samples to compute the whitening matrix.

38. The computer program product of claim 34, wherein the computer-readable medium further comprising code for:
computing a matrix of interference estimates based on input sequences; and
performing Cholesky decomposition of the matrix of interference estimates by reusing the one or more functions.

39. The computer program product of claim 38, wherein the computer-readable medium further comprising code for:
determining, during the Cholesky decomposition, a rank value according to a rank of the matrix of interference estimates and one of the functions, and wherein
one or more elements of the whitening matrix are determined using the rank value.

40. The computer program product of claim 34, wherein the computer-readable medium further comprising code for:
performing arbitration at a functional unit configured to execute one of the functions, if the functional unit is used multiple times for computing the whitening matrix.

41. The computer program product of claim 34, wherein the computer-readable medium further comprising code for:
performing operations utilizing pseudo floating point representation of numbers associated with the one or more sequences; and
reducing bit-width representation of the numbers.

42. The computer program product of claim 41, wherein the computer-readable medium further comprising code for:
de-normalizing elements of the whitening matrix, after reducing the bit-width representation of numbers.

43. The computer program product of claim 34, wherein reusing the one or more functions comprises:
using, multiple times for computing the whitening matrix, at least one functional unit associated with one of the functions.

44. The computer program product of claim 34, wherein the computer-readable medium further comprising code for:
computing a matrix of interference estimates based on the one or more sequences; and
computing one or more sub-blocks of the whitening matrix based on one or more other sub-blocks of the matrix of interference estimates by using multiple times a functional unit associated with one of the functions.

* * * * *